(12) United States Patent
Rensch

(10) Patent No.: US 6,921,079 B2
(45) Date of Patent: Jul. 26, 2005

(54) HYDRAULIC SEAL ARRANGEMENT

(75) Inventor: Detlef Rensch, Ludwigsfelde (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 0 days.

(21) Appl. No.: 10/340,667

(22) Filed: Jan. 13, 2003

(65) Prior Publication Data

US 2003/0168815 A1 Sep. 11, 2003

(30) Foreign Application Priority Data

Jan. 14, 2002 (DE) .......................... 102 01 055

(51) Int. Cl.[7] .............................................. F16J 15/40
(52) U.S. Cl. ...................................................... 277/428
(58) Field of Search ................... 277/411, 424, 277/428, 429

(56) References Cited

U.S. PATENT DOCUMENTS

| | | | | |
|---|---|---|---|---|
| 2,834,618 A | * | 5/1958 | Wiltse | 277/428 |
| 2,960,356 A | | 11/1960 | Tyce et al. | |
| 3,455,561 A | * | 7/1969 | Rinker et al. | 277/427 |
| 4,502,274 A | * | 3/1985 | Girault | 60/39.08 |
| 4,570,947 A | * | 2/1986 | Smith | 277/428 |
| 6,164,658 A | * | 12/2000 | Collin | 277/418 |
| 6,516,618 B1 | | 2/2003 | Böck | |
| 6,568,688 B1 | | 5/2003 | Boeck | |

FOREIGN PATENT DOCUMENTS

| | | |
|---|---|---|
| DE | 2559667 | 11/1977 |
| DE | 3328057 | 2/1984 |
| DE | 19916803 | 10/2000 |
| EP | 1103706 | 5/2001 |
| GB | 2125118 | 2/1984 |

OTHER PUBLICATIONS

German Search Report Aug. 20, 2002.

* cited by examiner

Primary Examiner—Alison K. Pickard
(74) Attorney, Agent, or Firm—Harbin King & Klima

(57) ABSTRACT

A hydraulic seal arrangement 5 between two shafts 1, 2 rotating relatively to each other, particularly in the same sense of rotation, of especially a gas turbine engine, where the radially outer shaft 2 has an annulus 5a extending radially outwards on its circumference into which the radially inner shaft 1 projects with a fin 5b that extends radially outwards on its circumference, said annulus 5a can be filled siphon-fashion through an inlet area 5d under centrifugal effect with a hydraulic fluid in the area of the free end of the fin 5b as the shaft(s) 1, 2 rotate(s), with an opening 7 branching off from an annulus area 5e for the discharge of hydraulic fluid, the annulus 5a being formed by a first outer shell part 8 and a second outer shell part 9 situated on the shaft 2.

32 Claims, 3 Drawing Sheets

HYDRAULIC SEAL ARRANGEMENT

This application claims priority to German Patent Application DE10201055.2, filed Jan. 14, 2002, the entirety of which is incorporated by reference herein.

BACKGROUND OF THE INVENTION

This invention relates to a hydraulic seal arrangement. More particularly, the present invention relates to a hydraulic seal arrangement between two shafts, especially of a gas turbine engine, which rotate relative to each other.

A hydraulic seal arrangement of the type specified is known from Specification DE 199 16 803 A1. A similar seal design is also presented in Specification EP 1103706 A2.

Such hydraulic seal arrangements are provided between two shafts which rotate at different speeds relative to each other, for example a low-pressure shaft and a high-pressure shaft, to insulate an area with relatively high pressure from an area with relatively low pressure. The basic principle of such hydraulic seal arrangements is comparable to a centrifugal-effect siphon.

These hydraulic seal arrangements are also used to supply lubricant or hydraulic fluid to at least one bearing which locates the two shafts relative to each other.

The seal arrangement described in Specification DE 199 16 803 A1 works satisfactorily, but is disadvantageous in that it entails a higher installation effort, depending on the design conditions. Furthermore, an annular groove must be provided on the second, outer shaft (high-pressure shaft), this incurring additional manufacturing effort. Therefore, this design cannot be used, or can be used only to a limited extent, on gas turbine engines on which a turbine disk forms one part with a bearing shaft, for example. Furthermore, it can be disadvantageous that the seal is situated close to the turbine, as a result of which the inner portion of the hydraulic seal arrangement is to be connected to the low-pressure turbine shaft (first, inner shaft) by means of a relatively long shaft. This arrangement is likely to result in rotor-dynamic problems.

BRIEF SUMMARY OF THE INVENTION

In a broad aspect, the present invention provides a hydraulic seal arrangement of the type specified at the beginning which combines simple design with cost-effective production and easy assembly.

It is a particular object of the present invention to provide a solution to the above problems by a combination of the features described herein, with further objects and advantages of the present invention becoming apparent from the description below.

The present invention accordingly provides for an annulus which is formed by a first outer shell part and a second outer shell part, both being located on the second shaft.

The hydraulic seal arrangement in accordance with the present invention is characterized by a variety of merits. Since the two outer shell parts which form the annulus area can be produced and installed separately, the design effort for the second, outer shaft will be considerably lower than for designs according to the prior art. Furthermore, assembly will be significantly facilitated since the two outer shell parts need merely be intermated and positioned relative to each other.

Here, it will be particularly advantageous if the first and the second outer shell part which form the annulus area are provided in a telescope-style arrangement. It can be particularly favorable here if the annulus area through which the hydraulic fluid is discharged from the seal arrangement is formed by the telescope-style arrangement of the two outer shell parts.

Additionally, in order to ensure the location or sealing of the outer shell parts against the first, inner shaft, it can be favorable to provide a sealing between one of the outer shell parts, preferably the first outer shell part, and the first shaft. This seal can, for example, be a mating ring, a piston ring or a similar component.

In order to ensure the axial location of the outer shell parts, it can be particularly favorable to axially secure at least one of the outer shell parts by means of a retaining ring. Such a retaining ring can easily be installed and requires only minimal design effort.

BRIEF DESCRIPTION OF THE DRAWINGS

This invention is more fully described in the light of the accompanying drawings showing a preferred embodiment. In the drawings.

DETAILED DESCRIPTION OF THE INVENTION

Figure 1:
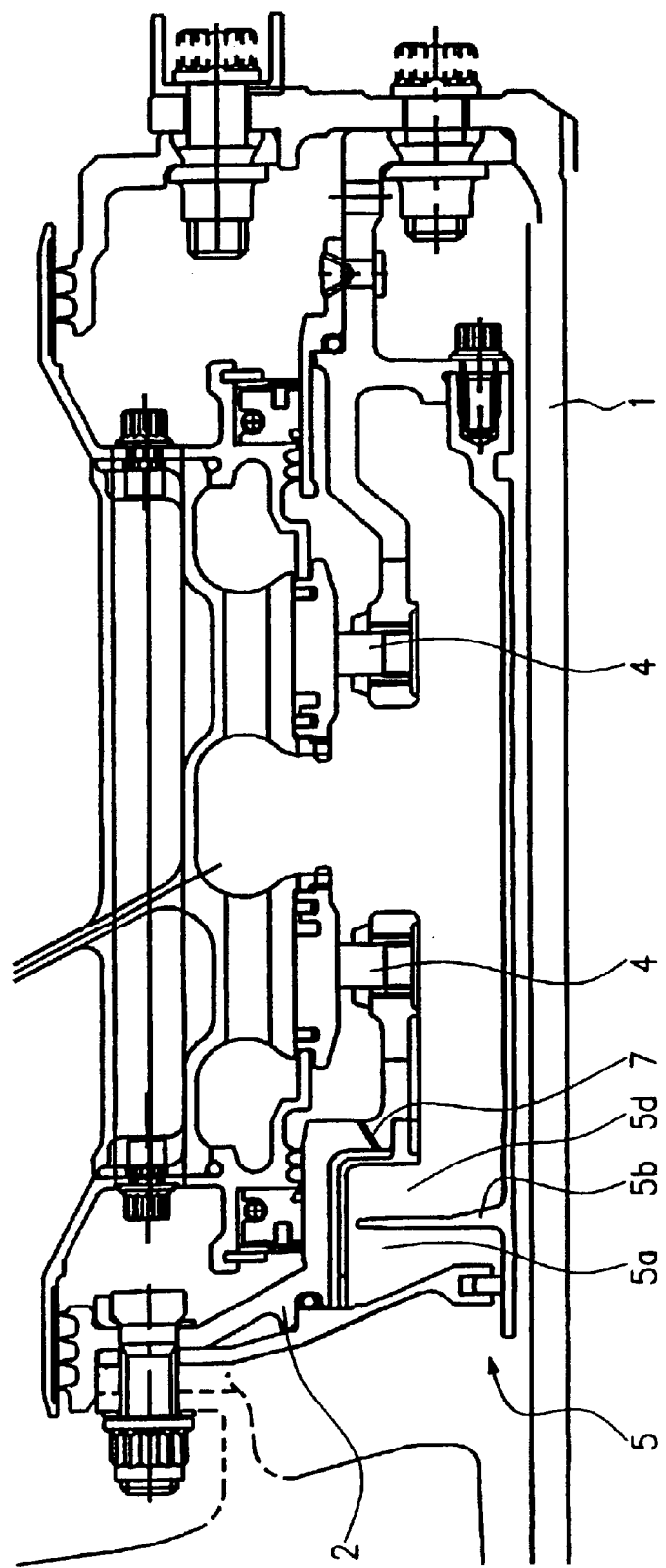
FIG. 1 is a simplified partial longitudinal view of a hydraulic seal arrangement in accordance with the state of the art.

FIG. 1 shows a state-of-the-art design as it is known from Specification DE 199 16 803 A1, for example.

Reference numeral 1 indicates a first shaft of a two-shaft gas turbine aero engine, while reference numeral 2 indicates a second shaft which is arranged radially outside the first shaft. Both shafts rotate at different speeds and, therefore, relative to each other (but preferably in the same sense of rotation) around a rotational axis 3 of the gas turbine aero engine. The shafts 1, 2—here shown in a partial representation only—are arranged concentrically to each other, with the first shaft 1, or the low-pressure shaft, being arranged inside the second shaft 2, or the high-pressure shaft. Reference numeral 4 indicates a bearing of the high-pressure shaft 2.

Located on the right-hand side of this bearing 4 and hence in radial direction, vertically to the axis of rotation 3, outside the shaft 2 is an area of the gas turbine interior in which a relatively low pressure exists. Located on the left-hand side of the bearing 4 and hence in radial direction, inside the shaft 2 is an area with relatively high pressure. These two areas are to be sealed one from the other by means of the hydraulic seal arrangement, said arrangement, which in its entirety is designated with the reference numeral 5, being provided between the two shafts 1, 2.

The hydraulic seal arrangement 5 is essentially formed by an annulus 5a which is provided in the interior of the outer shaft 2 and extends radially outwards on the shaft circumference. Projecting into this annulus 5a is a fin 5b which is provided on the inner shaft 1 and extends again radially outwards on the circumference of this shaft. A major portion of the annulus 5a and, in particular, that partial area into which the free end of the fin 5b projects, is filled during engine operation with oil from the oil circuit of the gas-turbine engine or, generally, with a hydraulic fluid. This filling, or supply, is accomplished through the inlet area 5d.

Through this annular inlet area 5d, located on the right-hand side of fin 5b, the hydraulic fluid introduced in the form of an oil jet between the two shafts 1, 2 can also be used to lubricate the bearing 4.

Owing to the rotation of the two shafts 1, 2 and the associated centrifugal effects, the hydraulic fluid supplied concentrates on the radially outward inner wall of the outer shaft 2. Accordingly, the hydraulic fluid, again under centrifugal effect, also enters the annulus 5a provided in the shaft 2, said annulus being radially further outward relative to the area of the inner wall into which the hydraulic fluid 5c is supplied. In the process, the hydraulic fluid collects in the annulus 5a on both the left-hand and the right-hand side of the fin 5b, thus creating an optimal hydraulic seal of the siphon type.

The surface or level of the hydraulic fluid on the left-hand side of the fin 5b here reaches further out radially than on the right-hand side of the fin 5b, since the latter, right-hand area of the fin 5b is connected with that area in which the pressure is considerably lower.

Furthermore, excess hydraulic fluid, which owing to the differential pressure conditions between the two areas with low pressure and high pressure in the annulus 5a, is hindered from reaching the area on the left-hand side of the fin 5b, can be discharged appropriately.

For further design aspects, reference is made to the state of the art.

As becomes apparent from FIG. 1, design and installation of the hydraulic seal arrangement incur quite a considerable effort.

Figure 2:
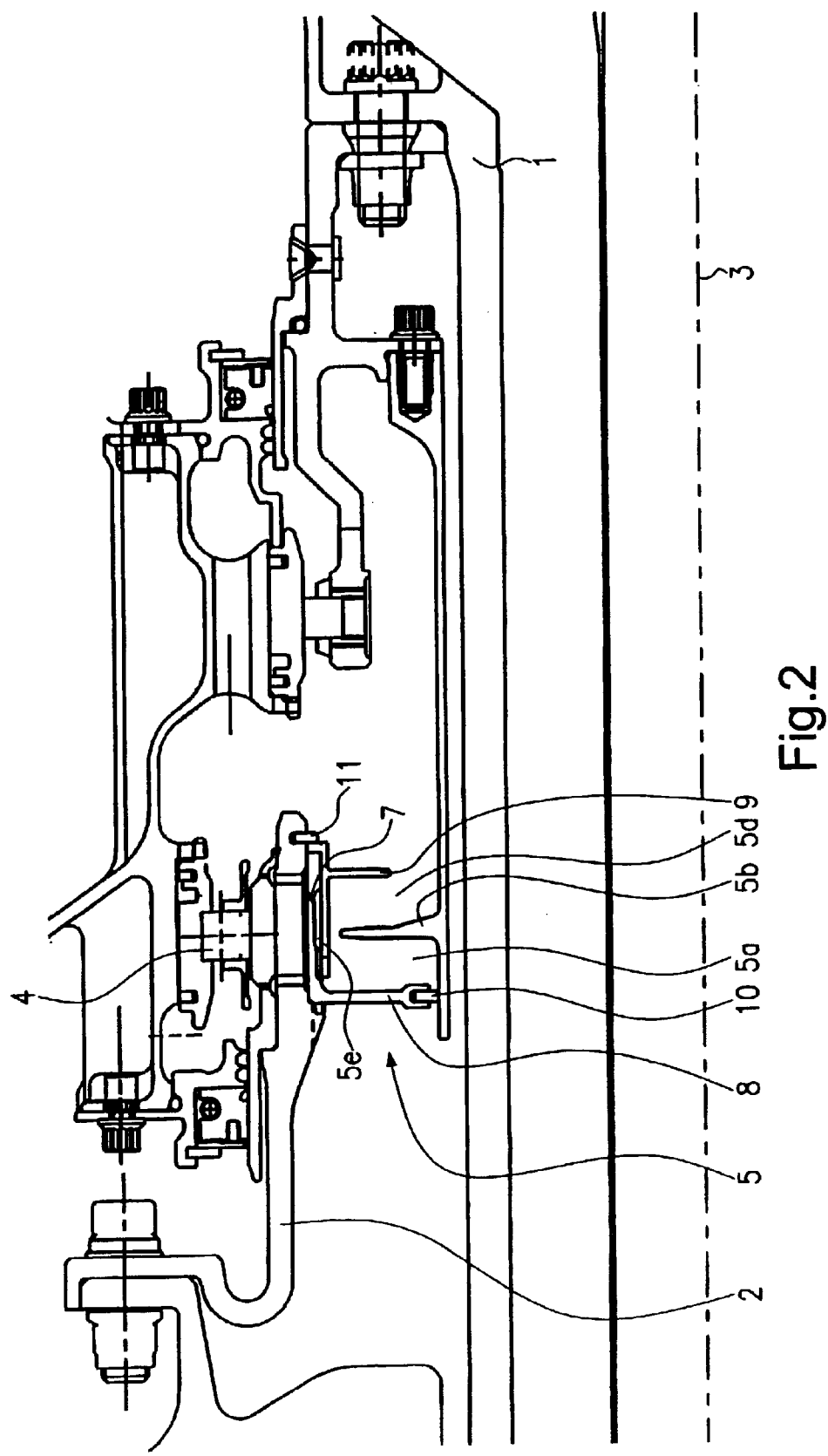
FIG. 2 is a sectional view, analogically to FIG. 1, of an embodiment of the present invention.
Figure 3:
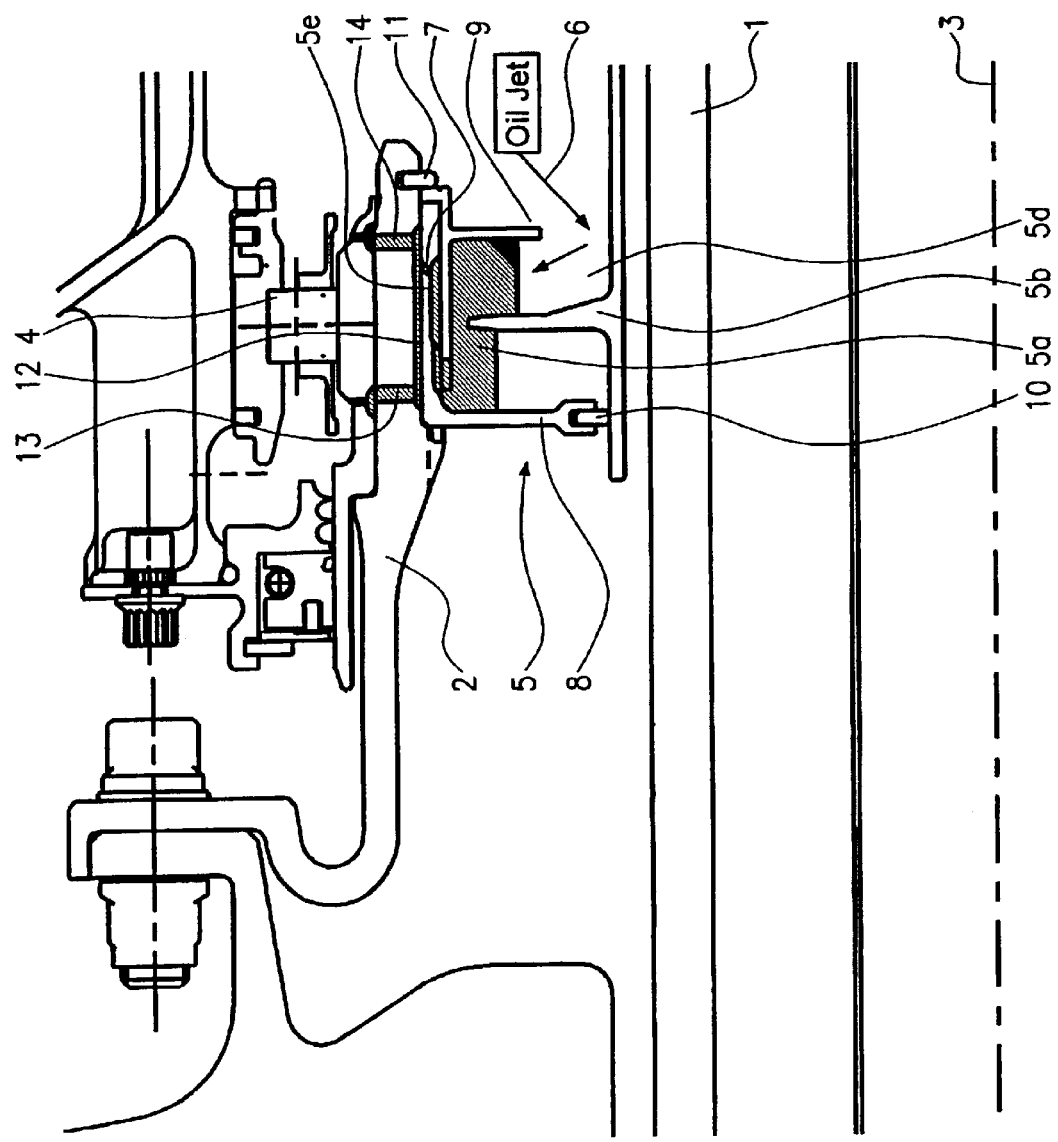
FIG. 3 is an enlarged view of the embodiment shown in FIG. 2.

FIGS. 2 and 3 show an embodiment of the hydraulic seal arrangement in accordance with the present invention. Compared with FIG. 1, the reference numerals refer to the same respective items.

The present invention accordingly provides for the annulus 5a being formed by a first outer shell part 8 and a second outer shell part 9. Parts 8 and 9 are secured against rotation relative to each other in a suitable manner, such as with a lug. The two outer shell parts 8 and 9 each have an essentially angular cross-section (refer to FIG. 3, in particular). The respective axial legs intermate in a telescopic way to form the annulus area 5e. The assembled outer shell parts 8 and 9 are locally secured against rotation relative to the second, outer shaft.

Furthermore, at least one opening 7 is provided on the first outer shell part 8 to convey hydraulic fluid from the annulus area 5e to a chamber 12 from which the hydraulic fluid can be supplied via radial ducts 13, 14 to the bearing 4.

For axial location of the second outer shell part 9, a retaining ring 11 is provided which can be installed in a groove on the second shaft 2.

For sealing the radial leg of the first outer shell part 8, a seal 10 is provided which may be of the piston-ring type.

Accordingly, the hydraulic seal arrangement as per the present invention consists of an inner member (fin 5b) which rotates at the speed of the low-pressure turbine shaft (first, inner shaft 1) and of two separate outer members (outer shell parts 8, 9) which intermate with each other and are secured by the retaining ring 11, thus forming the outer contour of the seal arrangement. Seal 10 provides appropriate containment at standstill of the engine.

The outer shell parts 8, 9 are also provided with suitable grooves, spacers, drain holes (opening 7) to ensure that the flow of oil, or hydraulic fluid, is continuous and as complete as possible throughout the hydraulic seal arrangement.

The hydraulic fluid is subsequently used directly for the lubrication of the bearing 4.

The magnitude of the flow of oil, or hydraulic fluid, depends on the minimum quantity required to ensure adequate cooling of the seal arrangement during operation and upon shutdown of the engine on the one hand and on the oil quantity required for lubrication of the radially further outward bearing 4 on the other hand.

The hydraulic seal arrangement in accordance with the present invention can be installed on the bearing shaft of the high-pressure turbine directly in the area of the bearing 4.

The oil (hydraulic fluid) is accordingly supplied in the direction of the oil jet 6 (see FIG. 3) via an inlet area 5d to the slower rotating inner member (fin 5b) of the hydraulic seal arrangement. From there, the oil (hydraulic fluid) reaches the actual seal arrangement, where it flows along the wall of the second outer shell part 9 to its forward end and, from there, back between the first and the second outer shell part 8 and 9, respectively. This provides for the cooling of the seal arrangement. Subsequently, the oil (hydraulic fluid) is forced through the openings 7 into the chamber 12, from where it reaches the bearing 4 via the radial ducts 13, 14. From there, the oil (hydraulic fluid) is returned to a tank via scavenge lines not illustrated.

Sealing of the bearing chamber of bearing 4 between the bearing shaft and the stator is effected by an efficient seal pack, e.g. a carbon mating-ring seal. The running face of this seal is integrated into the inner ring of the anti-friction bearing. This ensures that the running face is positioned very precisely relative to the anti-friction bearing and that manufacturing and assembly costs are minimized. The design of the bearing 4 is also known from the state of the art, so that a further, detailed description can be dispensed with herein.

Accordingly, the hydraulic seal arrangement, which combines seal and bearing on the oil side, can be associated directly with the bearing 4. This seal arrangement is mechanically superior since the positioning inaccuracies of the seal outer shells relative to the bearing will be minimal and the seal inner member will be situated closer to its location.

A further advantage lies in the apparent simplification of the oil circuit to both the seal arrangement 5 and the bearing 4.

The design according to the present invention ensures that the oil (hydraulic fluid) is used dually, i.e. it effects sealing and cooling of the sealing arrangement on the one hand and lubrication on the other hand.

Compared with the state of the art, fewer parts are required which, moreover, can be simpler designed. The installation of the sealing arrangement itself and of the rotor components is definitely facilitated, this resulting in a considerable reduction of the assembly costs.

A further advantage lies in the fact that the hydraulic seal arrangement is accessible, installable and replaceable without the need to remove the higher-pressure bearing 4 and the associated bearing support or the high-pressure spool.

Besides bearing shafts which are bolted to the final turbine disk, the solution according to the present invention also provides for arrangements in which the bearing shaft and the final turbine disk are designed as one-piece or integrated.

The invention is not limited to the versions shown here, but rather a wide variety of variations and modifications are possible within the framework of the invention. It is contemplated that the various features and characteristics of the present invention can be combined in different manners to create new embodiments.

What is claimed is:

1. A hydraulic seal arrangement between two shafts rotating relatively to each other, comprising:
   an annulus connected to a radially outer of the two shafts extending radially outwards on its circumference;
   a fin connected to a radially inner of the two shafts that extends radially outwards on its circumference and projects into the annulus;
   an inlet area through which the annulus can be filled siphon-fashion under centrifugal effect with a hydraulic fluid at least in an area of a free end of the fin as at least one of the shafts rotate; and
   at least one first opening branching off from the annulus for discharging a partial quantity of the hydraulic fluid from the annulus;
   wherein the annulus is formed by a first outer shell part and a second outer shell part which are connected to the radially outer shaft and the first outer shell part and the second outer shell part are arranged in a telescopic manner to form the annulus.

2. A hydraulic seal arrangement in accordance with claim 1, wherein the annulus is formed between radially extending portions of the first outer shell part and the second outer shell part.

3. A hydraulic seal arrangement in accordance with claim 2, and further comprising an annulus area formed between overlapping axially extending portions of the first outer shell part and the second outer shell part, the at least one first opening being connected to the annulus area to allow hydraulic fluid to flow from the annulus to the annulus area.

4. A hydraulic seal arrangement in accordance with claim 3, wherein at least one of the first outer shell part and the second outer shell part includes at least one second opening for the discharge of hydraulic fluid from the annulus area to a bearing supporting the radially outer shaft.

5. A hydraulic seal arrangement in accordance with claim 4, wherein the annulus is positioned directly radially inwardly from the bearing supporting the radially outer shaft.

6. A hydraulic seal arrangement in accordance with claim 5, wherein at least one of the first outer shell part and the second outer shell part is secured in an axial direction with at least one retaining ring connected to the radially outer shaft.

7. A hydraulic seal arrangement in accordance with claim 6, wherein the first outer shell part and the second outer shell part are secured against rotation relative to each other.

8. A hydraulic seal arrangement in accordance with claim 7, and further comprising a seal positioned between the first outer shell part and the radially inner shaft to seal between the first outer shell part and the radially inner shaft.

9. A hydraulic seal arrangement in accordance with claim 8, and further comprising the two shafts, which are shafts of a gas turbine engine.

10. A hydraulic seal arrangement in accordance with claim 1, wherein the annulus is formed between radially extending portions of the first outer shell part and the second outer shell part.

11. A hydraulic seal arrangement in accordance with claim 1, and further comprising an annulus area formed between overlapping axially extending portions of the first outer shell part and the second outer shell part, the at least one first opening being connected to the annulus area to allow hydraulic fluid to flow from the annulus to the annulus area.

12. A hydraulic seal arrangement in accordance with claim 11, wherein at least one of the first outer shell part and the second outer shell part includes at least one second opening for the discharge of hydraulic fluid from the annulus area to a bearing supporting the radially outer shaft.

13. A hydraulic seal arrangement in accordance with claim 12, wherein the annulus is positioned directly radially inwardly from the bearing supporting the radially outer shaft.

14. A hydraulic seal arrangement in accordance with claim 1, wherein at least one of the first outer shell part and the second outer shell part is secured in an axial direction with at least one retaining ring connected to the radially outer shaft.

15. A hydraulic seal arrangement in accordance with claim 1, wherein the first outer shell part and the second outer shell part are secured against rotation relative to each other.

16. A hydraulic seal arrangement in accordance with claim 1, and further comprising a seal positioned between the first outer shell part and the radially inner shaft to seal between the first outer shell part and the radially inner shaft.

17. A hydraulic seal arrangement in accordance with claim 1, and further comprising the two shafts, which are shafts of a gas turbine engine.

18. A hydraulic seal arrangement in accordance with claim 1, wherein the annulus is positioned directly radially inwardly from a bearing supporting the radially outer shaft.

19. A hydraulic seal arrangement between two shafts rotating relatively to each other, comprising:
   an annulus connected to a radially outer of the two shafts extending radially outwards on its circumference;
   a fin connected to a radially inner of the two shafts that extends radially outwards on its circumference and projects into the annulus;
   an inlet area through which the annulus can be filled siphon-fashion under centrifugal effect with a hydraulic fluid at least in an area of a free end of the fin as at least one of the shafts rotate; and
   at least one first opening branching off from the annulus for discharging a partial quantity of the hydraulic fluid from the annulus;
   wherein the annulus is formed by a first outer shell part and a second outer shell part which are connected to the radially outer shaft and the annulus is positioned directly radially inwardly from a bearing supporting the radially outer shaft.

20. A hydraulic seal arrangement in accordance with claim 19, wherein the annulus is formed between radially extending portions of the first outer shell part and the second outer shell part.

21. A hydraulic seal arrangement in accordance with claim 20, and further comprising an annulus area formed between overlapping axially extending portions of the first outer shell part and the second outer shell part, the at least one first opening being connected to the annulus area to allow hydraulic fluid to flow from the annulus to the annulus area.

22. A hydraulic seal arrangement in accordance with claim 21, wherein at least one of the first outer shell part and the second outer shell part includes at least one second opening for the discharge of hydraulic fluid from the annulus area to a bearing supporting the radially outer shaft.

23. A hydraulic seal arrangement in accordance with claim 22, wherein at least one of the first outer shell part and the second outer shell part is secured in an axial direction with at least one retaining ring connected to the radially outer shaft.

24. A hydraulic seal arrangement in accordance with claim 23, wherein the first outer shell part and the second outer shell part are secured against rotation relative to each other.

25. A hydraulic seal arrangement in accordance with claim 24, and further comprising a seal positioned between the first outer shell part and the radially inner shaft to seal between the first outer shell part and the radially inner shaft.

26. A hydraulic seal arrangement in accordance with claim 25, and further comprising the two shafts, which are shafts of a gas turbine engine.

27. A hydraulic seal arrangement in accordance with claim 19, and further comprising an annulus area formed between overlapping axially extending portions of the first outer shell part and the second outer shell part, the at least one first opening being connected to the annulus area to allow hydraulic fluid to flow from the annulus to the annulus area.

28. A hydraulic seal arrangement in accordance with claim 27, wherein at least one of the first outer shell part and the second outer shell part includes at least one second opening for the discharge of hydraulic fluid from the annulus area to a bearing supporting the radially outer shaft.

29. A hydraulic seal arrangement in accordance with claim 19, wherein at least one of the first outer shell part and the second outer shell part is secured in an axial direction with at least one retaining ring connected to the radially outer shaft.

30. A hydraulic seal arrangement in accordance with claim 19, wherein the first outer shell part and the second outer shell part are secured against rotation relative to each other.

31. A hydraulic seal arrangement in accordance with claim 19, and further comprising a seal positioned between the first outer shell part and the radially inner shaft to seal between the first outer shell part and the radially inner shaft.

32. A hydraulic seal arrangement in accordance with claim 19, and further comprising the two shafts, which are shafts of a gas turbine engine.

* * * * *